US006444768B1

(12) United States Patent
Webb et al.

(10) Patent No.: US 6,444,768 B1
(45) Date of Patent: Sep. 3, 2002

(54) PRODUCTION OF POLYISOBUTYLENE COPOLYMERS

(75) Inventors: Robert N. Webb, Kingwood, TX (US); Kenneth W. Powers, Berkeley Heights, NJ (US); Michael F. McDonald, Kingwood, TX (US); Ralph Howard Schatz, Dillon, CO (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/684,713

(22) Filed: Oct. 6, 2000

Related U.S. Application Data

(60) Provisional application No. 60/165,453, filed on Nov. 15, 1999, and provisional application No. 60/165,573, filed on Nov. 15, 1999.

(51) Int. Cl.[7] .......................... C08F 212/06; C08F 4/14
(52) U.S. Cl. .................. 526/237; 526/135; 526/185; 526/210; 526/212; 526/214; 526/216; 526/221; 526/347; 502/152; 502/156; 502/169
(58) Field of Search ............................. 526/135, 185, 526/221, 237, 347, 210, 212, 214, 216; 502/154, 156, 169, 152

(56) References Cited

U.S. PATENT DOCUMENTS

| | | |
|---|---|---|
| 3,560,458 A | 2/1971 | Kennedy et al. |
| 4,611,037 A | 9/1986 | Musch et al. |
| 4,740,572 A | 4/1988 | Musch et al. |
| 5,162,445 A | 11/1992 | Powers et al. |
| 5,169,914 A | 12/1992 | Kaszas et al. |
| 5,206,043 A | 4/1993 | White et al. |
| 5,211,974 A | 5/1993 | White et al. |
| 5,247,021 A * | 9/1993 | Fujisawa et al. ......... 526/221 X |
| 5,376,744 A | 12/1994 | Kennedy et al. ............. 526/89 |
| 5,403,803 A | 4/1995 | Shaffer et al. |
| 5,458,796 A | 10/1995 | Storey et al. |
| 5,506,316 A | 4/1996 | Shaffer et al. |
| 5,580,935 A | 12/1996 | Shaffer et al. |
| 5,639,525 A | 6/1997 | Kuhn et al. |
| 5,703,183 A * | 12/1997 | Shaffer ................... 526/348 X |
| 5,731,053 A | 3/1998 | Kuhn et al. |

FOREIGN PATENT DOCUMENTS

| | | |
|---|---|---|
| EP | 0 279 456 | 8/1988 |
| EP | 0 599 356 B1 | 12/1995 |
| EP | 0 478 110 B1 | 3/1996 |
| EP | 0 488 491 B1 | 3/1996 |
| EP | 0713883 A1 | 5/1996 |
| EP | 0 722 957 A1 | 7/1996 |
| WO | WO 93/21241 | 10/1993 |
| WO | WO 95/29940 | 9/1995 |
| WO | WO 97/35895 | 10/1997 |
| WO | WO 00/40624 | 7/2000 |
| WO | WO 01/36498 A1 | 5/2001 |

OTHER PUBLICATIONS

J.P. Kennedy and E. Marêchal, "Carbocationic Polymerization", Kreiger Publishing Company, 1991. (Book).
J.P. Kennedy and E. Marêchal, "Carbocationic Polymerization", pp. 32, 199, 449, 452, 460 and 461.
Kresege and Wang, "Elastomers Synthetic (Butyl Rubber)", Kirk Othmer Encyclopedia of Chemical Technology, vol. 8, 4th ed., pp. 934–955 (1993).
Kaszás, et al., "Quasiliving Carbocationic Polymerization XII. Forced Ideal Copolymerization of Isobutylene with Styrene", Journal of Macromol. Sci–Chem., A18(9), pp. 1367–1382 (1982–83).
O. Nuyken, et al., Recent Progress Towards An Understanding Of The Inifer Mechanism, Polymer Preprints 26 (1), pp. 44–45 (1985).
Storey, et al., "Kinetic Investigation Of The Living Cationic Polymerization Of Isobutylene Initiated By 2–Chloro–2, 4,4–Trimethyl Pentane", Polymer Preprint 36(2), pp. 304–305 (1995).
Kaszás, et al., "Electron–Pair Donors In Carbocationic Polymerization. III. Carbocation Stabilization By External Electron–Pair Donors in Isobutylene Polymerization", Journal of Macromol. Sci.–Chem., A26(8), pp. 1099–1114 (1989).
Faust, et al, "Living Carbocationic Polymerization. XXXVIII. On The Nature Of The Active Species In Isobutylene and Vinyl Ether Polymerization†", Journal of Macromol. Sci.–Chem., A28(1), pp. 1–13 (1991).
Kennedy, et al., "Living Carbocationic Polymerization. XXXIX. Isobutylene Polymerization In The Presence Of Pyridine And Various Other Electron Donors", Journal of Macromol. Sci–Chem., A28(2), pp. 197–207 (1991).
Pernecker, et al., "Living Carbocationic Polymerization. LVII. Kinetic Treatment Of Living Carbocationic Polymerization Mediated By The Common Ion Effect", J.M.S.–Pure Appl. Chem. A30(6 & 7), pp. 399–412 (1993).
Kelen, et al., "Some Aspects Of The Living Isobutylene Polymerization", Makromol. Chem., Macromol. Symp. 67, pp. 325–338 (1993).
Lubnin, et al., "Identification Of Initiator Fragments In Polyisobutylene By NMR Spectroscopy", J.M.S.–Pure Appl. Chem., A31(6), pp. 655–663 (1994).
Storey, et al., "Synthesis And Characterization Of Polyisobutylene Star–Branched Polymers", Polymer Preprint 35(2), pp. 578–579 (1994).

* cited by examiner

*Primary Examiner*—Fred Teskin
(74) *Attorney, Agent, or Firm*—Frank E. Reid; Kevin M. Faulkner

(57) ABSTRACT

The invention relates to a new improved catalyst to produce random copolymers of one or more iso-olefin monomers and one or more para-alkylstyrene monomers. The invention also relates to an improved continuous slurry polymerization process to produce random copolymers using the improved catalyst system. The process is carried out in an anhydrous polymerization system containing a mixture of the monomers in a polar solvent along with a Lewis acid and a stabilizing initiator.

20 Claims, No Drawings

US 6,444,768 B1

PRODUCTION OF POLYISOBUTYLENE COPOLYMERS

This is based on Provisional Application U.S. Ser. No. 60/165,453 and U.S. Ser. No. 60/165,573, both filed on Nov. 15, 1999.

FIELD OF INVENTION

The invention relates to an improved method for production of copolymers of isobutylene useful in rubber compounds.

BACKGROUND

Isobutylene-isoprene polymers have been well known since the 1930s. They have good impermeability to air and a high level of damping when stretched or compressed. These polymers are used extensively throughout the tire and pharmaceutical industries. The copolymers are made by a cationic slurry polymerization process at approximately –95° C. using a catalyst comprising a Lewis Acid and an initiator. Suitable Lewis Acids and initiators are well documented by Kennedy, J. P. and Marechal, E., "Carbocationic Polymerization", Krieger Publishing Company, 1991. Lewis Acids such as the aluminum alkyls and aluminum chloride are used extensively in both laboratory experiments and commercial scale production. Initiators such as water and anhydrous HCl are used extensively.

Isobutylene-para-methylstyrene (IPMS) polymers are also well known. They are made in a similar process to isobutylene-isoprene polymers using similar initiation systems and are also used in the tire and pharmaceutical industries. However, there are a number of difficulties with IPMS polymerization, as compared to isobutylene-isoprene copolymerization, and these difficulties are exacerbated by higher levels of para-methylstyrene (PMS) co-monomer. These difficulties include: instability of reaction temperatures and flash gas (reactor liquid composition); instability of Mooney viscosity control; lower than desirable conversion of monomer to product; higher than desirable warm-up rates due to rubber fouling, particularly around the reactor circulation pump; lower than desirable operability limitation on slurry concentrations; shorter reactor run lengths under comparable conditions; higher slurry viscosity under comparable conditions; and poorer and more erratic response of reactor to control parameters. Because of these difficulties it has historically been much more difficult and costly to produce IPMS copolymers than conventional isobutylene-isoprene copolymers. Currently, these undesirable process characteristics are managed by limiting throughput, PMS content, or a combination of the two.

It would be desirable to have a method for production of IPMS copolymers that reduces the magnitude of one or more of these complications, thereby reducing the current limitations on throughput and/or PMS content.

SUMMARY OF THE INVENTION

The invention relates to a new catalyst system for a continuous slurry polymerization process to produce random copolymers of one or more iso-olefin monomers and one or more para-alkylstyrene monomers. The process is carried out in an anhydrous polymerization system containing a mixture of the monomers in a polar solvent along with a Lewis acid and a stabilizing initiator. This polymerization system is capable of forming an in-situ electron pair donor using a stabilizing initiator. The stabilizing initiator according to this invention has the formula:

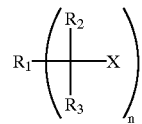

wherein:
R$_1$ is an alkyl, alkenyl, aryl, aralkyl, or aralkenyl group containing up to 30 carbon atoms but not less than 3 carbon atoms unless R$_1$ contains at least one olefinic unsaturation,
R$_2$ and R$_3$ are alkyl, aryl, or aralkyl groups containing up to 30 carbon atoms and can be the same or different,
X is a halogen or a carboxy, hydroxyl, or alkoxyl group, preferably a halogen, and n is a positive whole number.

DETAILED DESCRIPTION

The invention concerns a catalyst system and process for production of isoolefin copolymers containing a para-alkylstyrene comonomer. An improved catalyst system and process has been discovered which affords many unexpected advantages for commercial slurry polymerization of IPAS copolymers generally, and in particular IPMS copolymers. The invention is particularly useful in production of isoolefin-para-alkylstyrene (IPAS) copolymers having a higher PAS content, particularly isobutylene-para-methylstyrene (IPMS) copolymers having a higher PMS content (e.g. 10–20 weight percent PMS). This new catalyst system includes a Lewis acid with a new stabilizing initiator as described later in more detail.

The discussion and examples below are focused on preferred embodiments of the broad invention. In a particularly preferred embodiment, the copolymers produced contain isobutylene as the isoolefin and para-methylstyrene as the para-alkylstyrene comonomer. Discussion of these preferred embodiments should not be construed so as to limit the broad invention, which is applicable generally to copolymers of one or more isoolefin and one or more para-alkylstyrene (PAS) monomers. To the extent that our description is specific, this is done solely for the purpose of illustrating certain preferred embodiments and should not be taken as restricting the invention to these embodiments.

In accordance with the present invention applicants have discovered an improved polymerization system for copolymerizing an iso-mono-olefin having from 4 to 7 carbon atoms and para-alkylstyrene monomers. In accordance with a preferred embodiment of the invention, the process produces copolymers containing between about 80 and 99.5 wt. % of the isoolefin such as isobutylene and between about 0.5 and 20 wt. % of the para-alkylstyrene such as para-methylstyrene. In accordance with another embodiment, however, where glassy or plastic materials are being produced as well, the copolymers comprise between about 10 and 99.5 wt. % of the isoolefin, or isobutylene, and about 0.5 and 90 wt. % of the para-alkylstyrene, or para-methylstyrene.

The polymerization system of the invention contains a mixture of a Lewis acid catalyst, an initiator, and a polar solvent. The copolymerization reactor is maintained substantially free of impurities which can complex with the catalyst, the initiator, or the monomers, and the polymerization reaction is conducted under conditions to limit or avoid chain transfer and termination of the growing polymer chains. Anhydrous conditions are highly preferred and reactive impurities, such as components containing active hydrogen atoms (water, alcohol and the like) must be removed from both the monomer and solvents by techniques well-known in the art.

The polymerization reaction temperature is conveniently selected based on the target polymer molecular weight and the monomer to be polymerized as well as standard process variable and economic considerations, e.g., rate, temperature control, etc. The temperature for the polymerization is between −10° C. and the freezing point of the polymerization system, preferably from −25° C. to −120° C., more preferably from −40° C. to −100° C., depending on polymer molecular weight. Reaction pressure will typically be about 200 kPa to about 1600 kPa, more typically about 300 kPa to about 1200 kPa, and preferably about 400 kPa to about 1000 kPa. In order to avoid moisture condensation the reaction should be carried out under a dry inert gas atmosphere, preferably carbon dioxide or nitrogen gas, or with a liquid seal.

Isomonoolefin and PAS, particularly isobutylene and PMS, are readily copolymerized under cationic conditions. The copolymerization is carried out by means of a Lewis Acid catalyst. Suitable Lewis Acid catalysts (including Friedel-Crafts catalysts) for the process according to the present invention thus include those which show good polymerization activity with a minimum tendency to promote alkylation transfer and side reactions which can lead to branching and the production of cross-links resulting in gel-containing polymers with inferior properties. The preferred catalysts are Lewis Acids based on metals from Group IIIa, IV and V of the Periodic Table of the Elements, including boron, aluminum, gallium, indium, titanium, zirconium, tin, vanadium, arsenic, antimony, and bismuth. The preferred metals are aluminum, boron and titanium, with aluminum being the most preferred. In the practice of the method of this invention, weaker acids are preferred as they lead to less alkylation and branching and higher monomer conversion rates.

The Group IIIa Lewis Acids have the general formula $R_mMX_p$, wherein M is a Group IIIa metal, R is a monovalent hydrocarbon radical selected from the group consisting of $C_1$ to $C_{12}$ alkyl, aryl, alkylaryl, arylalkyl and cycloalkyl radicals; m and p are integers from 0 to 3; X is a halogen independently selected from the group consisting of fluorine, chlorine, bromine, and iodine, preferably chlorine; and the sum of m and p is equal to 3. Nonlimiting examples include aluminum chloride, aluminum bromide, boron trifluoride, boron trichloride, ethyl aluminum dichloride (EtAlCl$_2$ or EADC), diethyl aluminum chloride (Et$_2$AlCl or DEAC), ethyl aluminum sesquichloride (Et$_{1.5}$AlCl$_{1.5}$ or EASC), trimethyl aluminum, and triethyl aluminum.

The Group IV Lewis Acids have the general formula MX$_4$, wherein M is a Group IV metal and X is a ligand, preferably a halogen. Nonlimiting examples include titanium tetrachloride, zirconium tetrachloride, or tin tetrachloride.

The Group V Lewis Acids have the general formula MX$_y$, wherein M is a Group V metal, X is a ligand, preferably a halogen, and y is an integer from 3 to 5. Nonlimiting examples include vanadium tetrachloride and antimony pentafluoride.

Particularly preferred Lewis acids may be any of those useful in cationic polymerization of isobutylene copolymers including: AlCl$_3$, EADC, EASC, DEAC, BF$_3$, TiCl$_4$, etc. with EASC and EADC being especially preferred.

Catalyst efficiency (based on Lewis Acid) in the reactor is maintained between 10000 lb. of polymer/lb. of catalyst and 300 lb. of polymer/lb. of catalyst and preferably in the range of 4000 lb. of polymer/lb. of catalyst to 1000 lb. of polymer/lb. of catalyst by controlling the molar ratio of Lewis Acid to stabilizing initiator.

According to the invention, the Lewis Acid catalyst is used in combination with a stabilizing initiator. The stabilizing initiators, of which 2-chloro-2,4,4-trimethyl-pentane (TMPCl) is a preferred example, are those initiators which are capable of being precomplexed in cold methyl chloride or other suitable solvent with the chosen Lewis Acid to yield a stable complex which is in equilibrium with a carbenium ion pair which directly forms a propagating polymer chain in the reactor. These initiators yield a fast, simple initiation of polymerization in the reactor as opposed to the slow stepwise initiations involving many polar complexes and non-propagating ion pairs characteristic of the catalyst systems conventionally used in commercial cationic slurry polymerization of isobutylene copolymers. This polymerization system is capable of forming an in-situ electron pair donor with a stabilizing initiator having the formula:

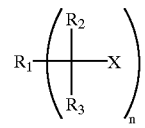

wherein:
$R_1$ is an alkyl, alkenyl, aryl, aralkyl, or aralkenyl group containing up to 30 carbon atoms but not less than 3 carbon atoms unless $R_1$ contains at least one olefinic unsaturation, $R_2$ and $R_3$ are alkyl, aryl, or aralkyl groups containing up to 30 carbon atoms and can be the same or different, X is a halogen or a carboxy, hydroxyl, or alkoxyl group, preferably a halogen selected from fluorine, chlorine, bromine, and iodine, most preferably chlorine, and n is a positive whole number.

Multifunctional initiators (n>2) are employed where the production of branched copolymers is desired, while mono- and di-functional initiators are preferred for the production of substantially linear copolymers.

As previously indicated, the initiator of the type contemplated by the invention may be tert-esters or tert-ethers producing in situ electron pair donors upon the addition of the Lewis acid in order to promote copolymerization of the monomers in a continuous slurry polymerization process. Suitable initiators are cumyl esters of hydrocarbon acids, and alkyl cumyl ethers. Representative initiators, for example, comprise compounds such as 2-acetyl-2-phenylpropane, i.e., cumyl acetate; 2-methoxy-2-phenyl propane, i.e., cumylmethyl-ether; 1,4-di(2-methoxy-2-propyl)benzene, i.e., di(cumylmethyl ether); the cumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); the aliphatic halides, particularly the chlorides, i.e., 2-chloro-2,4,4-trimethylpentane, 2,6-dichloro-2,4,4,6-tetramethylheptane; cumyl and aliphatic hydroxyls such as 1,4-di((2-hydroxyl-2-propyl)-benzene) and 2,6-dihydroxyl-2,4,4,6-tetramethyl-heptane and similar compounds. These stabilizing initiators are generally tertiary or allylic alkyl or benzylic halides and may include polyfunctional initiators. Preferred examples of these stabilizing initiators include: TMPCl, TMPBr, cumyl chloride as well as 'di-' and 'tri-' cumyl chloride or bromide.

The selected solvent or solvent mixture should provide a solvent medium having some degree of polarity in order for the polymerization to proceed at a reasonable rate. To fulfill this requirement a mixture of nonpolar and polar solvent can be used but one or a mixture of polar solvents is preferred. Suitable nonpolar solvent components includes hydrocarbons and preferably aromatic or cyclic hydrocarbons or mixtures thereof. Such compounds include, for instance, methylcyclohexane, cyclohexane, toluene, carbon disulfide and others. Appropriate polar solvents include halogenated hydrocarbons, normal, branched chain or cyclic hydrocarbons. Specific compounds include the preferred liquid solvents such as ethyl chloride, methylene chloride, methylchloride, $CHCl_3$, $CCl_4$, n-butyl chloride, chlorobenzene, and other chlorinated hydrocarbons. Methyl chloride produces exceptional results and therefore, is especially preferred. To achieve suitable polarity and solubility, it has been found, that if the solvent, or diluent, is mixed, the mixture is preferably at least 70% polar solvent, on a volume basis.

As is normally the case, product molecular weights are determined by reaction time, temperature, concentration, the nature of the reactants, and similar factors. Consequently, different reaction conditions will produce different products. Synthesis of the desired reaction product will be achieved, therefore, through monitoring the course of the reaction by the examination of samples taken periodically during the reaction, a technique widely employed in the art and shown in the examples or by sampling the effluent of a continuous reactor.

The reactors which may be utilized in the practice of the present invention include conventional reactors and equivalents thereof such as batch reactors, stirred tank reactors, fluidized bed reactors, and series tank or tubular reactors, and the like. The reactor will contain sufficient amounts of the catalyst system of the present invention effective to catalyze the polymerization of the monomer containing feedstream such that a sufficient amount of polymer having desired characteristics is produced. The reaction conditions will be such that sufficient temperature, pressure and residence time are maintained effective to maintain the reaction medium in the liquid state and to produce the desired polymers having the desired characteristics.

Typically, the catalyst (Lewis Acid) to monomer ratio utilized will be those conventional in this art for carbocationic polymerization processes. For example, catalyst to monomer mole ratios will typically be about 1/60,000 to about 1/50, more typically about 1/10,000 to about 1/100, and preferably about 1/2000 to about 1/200. This mole ratio will be calculated by determining the number of Lewis acid catalyst sites in the Lewis acid catalyst. This can be done by using conventional analytic testing techniques such as elemental analysis, nuclear magnetic resonance (NMR) spectroscopy (e.g., aluminum NMR), and absorption spectroscopy. Once the number of Lewis acid sites per unit of catalyst is known, the mole ratio is calculated in a conventional manner.

The preferred molar ratio of Lewis Acid to stabilizing initiator is in the range of 20/1 to 1/1, more preferably in the range of 10/1 to 2/1.

The monomer feedstream is preferably substantially anhydrous, that is, it contains less than 50 ppm, and more preferably less than about 30 ppm, and most preferably less than about 10 ppm, by weight of water. Such low levels of water can be obtained by contacting the feedstream, prior to the reactor, with a water absorbent (such as NaH, $CaCl_2$, $CaSO_4$, molecular sieves, alumina and the like) or by the use of distillation drying.

The monomer feedstream is typically substantially free of any impurity which is adversely reactive with the catalyst under the polymerization conditions. For example, the monomer feed preferably should be substantially free of bases (such as caustic), sulfur-containing compounds (such as $H_2S$, COS, and organo-mercaptans, e.g., methyl mercaptan, ethyl mercaptan), N-containing compounds, oxygen containing bases such as alcohols and the like.

The order of contacting the monomer feedstream, catalyst, cocatalyst (if any), and solvent is not critical to this invention. Preferably, the stabilizing initiator and Lewis Acid are pre-complexed by mixing together in cold methyl chloride or other suitable cold polar solvent, immediately before injection into the continuous reactor through a catalyst nozzle in the standard way.

The stabilizing initiator and Lewis Acid are allowed to precomplex by mixing together in cold methyl chloride at temperatures between $-50°$ C. and $-98°$ C. with a contact time between 0.5 seconds and several hours, preferably between 1 second and 5 minutes before injection into the reactor.

The overall residence time in the reactor can vary, depending upon, e.g., catalyst activity and concentration, monomer concentration, reaction temperature, and desired molecular weight, and generally will be between about one minute and five hours, and preferably between about 10 and 60 minutes. The principle variable controlling residence time is the monomer feed diluent rate.

The new catalyst system and process affords many unexpected advantages for commercial slurry polymerization of IPAS copolymers generally, and in particular IPMS copolymers. This new catalyst system comprised of an aluminum alkyl such as EASC and TMPCl initiator has been unexpectedly demonstrated to greatly mitigate or completely overcome the difficulties as enumerated above in previous attempts to produce IPMS elastomers using the established commercial catalyst systems previously used. The improvements obtained with this new catalyst have been demonstrated both in laboratory slurry polymerizations and in commercial plant scale tests.

Copolymers of isobutylene and p-methylstyrene were discovered (U.S. Pat. No. 5,162,445) and have been under development for more than 10 years. These relatively new isobutylene-based copolymers have many advantages over conventional butyl rubbers (isobutylene/diene copolymers, such as isobutylene/isoprene), which makes them useful and desirable in a wide range of applications. They retain the low permeability and high damping characteristics of conventional butyl rubbers but because of the absence of the backbone unsaturation present in butyl rubbers, IPMS elastomers possess outstanding ozone resistance. The absence of backbone unsaturation coupled with the presence of enchained aromatic rings also imparts greatly improved aging and environmental resistance so that they are useful under more extreme conditions and in harsher environments than most other elastomers. The enchained aromatic rings can also impart greatly improved resistance to degradation due to ultraviolet light as compared to other isobutylene-based elastomers.

While IPMS copolymers have many desirable properties and may be usefully and advantageously utilized in many applications, commercial production of various IPMS copolymers has presented many challenges which have previously forced them to be produced under conditions which have been far more costly and difficult than those employed in the production of conventional butyl rubbers. The problems have centered upon polymerization reactor control and fouling, and the removal and disposition of the unconverted PMS in the copolymers. These problems have been found to be greatly exacerbated as the PMS level in the copolymers is increased. For example, even though IPMS copolymers containing 10–15 weight percent PMS have been shown to give improved performance in certain large volume applications such as tire sidewalls, attempts to produce these polymers in commercial volumes have been impractical or uneconomic.

Mass fouling in reactors producing IPMS copolymers has been found to be much more severe than in reactors producing conventional butyl, especially around the reactor circulation pump. This fouling rate gets progressively worse as PMS level is raised and/or as level of hydrocarbon in the feed and slurry concentration (weight of polymer in reactor/weight of liquid plus polymer in reactor) in the reactors is raised. Fouling rates also increase as production rates and heat load on the reactor are increased. As fouling progresses, reactor circulation and hence the ability to remove heat from the reactor are reduced. At some point the ability to remove heat is reduced an amount sufficient to require removal of the reactor from service for cleaning. In normal plant operations, there is typically a rotation sequence between reactors producing product and those out of service for cleaning. Therefore fouling rate in the producing reactors must be reduced sufficiently to permit time to clean the other reactors. Excessive fouling rates must be offset by uneconomic steps such as reductions in level of hydrocarbon in the feed and slurry concentration and/or production rate and heat load. Normally butyl rubbers can be produced at slurry concentrations of about 28–30% and reactor production rates of 6–7 klb./hr or more with acceptable reactor run lengths In contrast, comparable reactors and catalyst systems producing IPMS copolymers containing less than 5 weight percent PMS have been limited to slurry concentrations of less than 18% and production rates of less than 5 klb./hr in order to achieve acceptable reactor run lengths. Allowable slurry concentrations and production rates continue to decrease as PMS content is increased, eventually leading to unsuitable if not impossible operating conditions.

Furthermore, conventional butyl processes are easily stabilized, whereas uncontrollable cycling of reactor flash gas and reactor temperature in IPMS processes frequently result in products that do not meet desired specifications and at higher production costs.

It has been discovered that changing the catalyst system to a stabilizing initiator, such as TMPCl, in conjunction with a Lewis acid, such as EASC, enables excellent stable reactor control to be achieved during production of IPMS copolymers (even at a higher PMS content, such as 10–20 weight percent) and mitigates the mass fouling rates so that acceptable run length can be achieved at much higher feed hydrocarbon and slurry concentrations and higher production rates with little off-spec production so that production costs can be greatly reduced. This new catalyst system also enables production to be accomplished at higher conversion with less unconverted PMS and so mitigates the problems associated with the unconverted PMS.

Without limiting the scope of the invention, it is believed that many of the benefits of the process of this invention are derived from use of the stabilizing initiators. These initiators are believed to promote a much simpler and faster initiation by elimination of most if not all of the intermediate polarized complexes and non-propagating ion pairs formed when conventional initiators are used.

In a particularly preferred embodiment, the TMPCl is made by dissolving isobutylene dimer in methyl chloride and then adding anhydrous HCl to form the alkyl chloride. Excess HCl is then purged by nitrogen and the resulting solution of TMPCl in methyl chloride is used as the initiator stream in a continuous plant to make IPMS polymers. In the commercial-type process, the TMPCl stream is mixed with a cold methyl chloride stream and an aluminum alkyl stream to form the catalyst system. This stream is then injected into the stirred tank butyl type reactor to initiate the polymerization of the IPMS elastomer under much more controllable and economic conditions than has previously been possible.

The catalyst system of this invention which comprises a stabilizing initiator, such as TMPCl, in conjunction with a Lewis acid, such as EASC, eliminates the required sequence of initiation steps and all of the intermediate associated polar complexes and non-propagating ion pairs to greatly reduce the electro-viscous effects caused by carged particles and greatly speeds up the initiation process. With the TMPCl/EASC catalyst system the final initiating complex is fed directly into the reactor and the chain-propagating ion-pair forms directly. Hence, the catalyst system of this invention results in the observed, lower slurry viscosity and permits running reactors at higher feed HC levels and slurry concentrations.

While butyl-type reactors may be thought of as well-mixed stirred tanks on a reactor residence time scale, they are pump-around heat exchangers with non-homogenous zones beneath the pump where feed is introduced and around the nozzle where the catalyst stream is injected (normally on the side of the bottom head). The monomer—rich zone beneath the pump can be particularly troublesome because feed may be introduced with as high as 40% monomer concentration whereas the steady-state monomer level in the reactor may be <1%. Despite the high circulation rates in butyl reactors and the considerable efforts made to achieve good mixing, it still takes some time to dilute the incoming rich-feed to the reactor steady-state conditions and all rate processes can be much faster in this monomer rich zone. It is desirable to achieve and maintain homogenous complexation, initiation and polymerization rates throughout the reactor and in particular to avoid too much and too rapid reactions in the monomer rich zone around the feed inlet. Too rapid reactions in that zone produce a hot zone in which mass-fouling can occur. This situation is much easier to avoid and control in butyl reactors because the feed contains a retarder (isoprene) which slows down and moderates the initiation and polymerization rates in the feed rich zone. In IPMS elastomer reactors, the feed does not contain a moderating but rather an accelerating comonomer so mass-fouling around the pump is much harder to avoid and control. With the usual catalyst systems (HCl/AlCl$_3$, HCl/EADC, etc.) all of the step wise initiation reactions occur more rapidly in this monomer-rich zone and so it becomes the zone in which many initiations occur and is also a zone where electro-viscous effects are high because it is a zone rich in polarized complexes and ion-pairs. This combination of high viscosity and high rates can result in rapid mass-fouling in this area and necessitate reducing the feed hydrocarbon level and slurry concentration in IPMS reactors.

These problems are amplified as PMS comonomer level is increased because the styrenic monomers complex more rapidly and strongly with the Lewis acids (they are better bases, or electron-donors) than do the olefinic monomers. A particular problem with PMS is that it inherently contains a minor amount of meta-methylstyrene (MMS) as an impurity. Even a minor amount of MMS leads to chain terminations due to formation of a non-propagating indanyl ion pair. Since the process and catalyst of this invention permit lower PMS concentration at greater polymerization efficiency, less MMS is introduced in to the polymerization medium thus reducing the probability of undesirable chain termination.

The new TMPCl/Lewis acid catalyst system greatly mitigates this problem and moves the initiation away from the feed rich zone because the initiating complex (and chain propagating ion pair in equilibrium with it) is introduced directly into the reactor and doesn't have to form preferentially in the feed rich zone. The catalyst system according to this invention then results in the more desired homogenous initiation and polymerization throughout the reactor and greatly mitigates the mass fouling rate in the rich feed zone around the pump. This reduction in the mass fouling rates enables feed hydrocarbon and slurry concentrations to be raised while still maintaining acceptable run lengths, thus enabling IPMS reactors to be operated under more favorable and economic conditions.

The catalyst system of this invention also greatly ameliorates the reactor control problems characterized by oscillating reactor flash gas and temperature. This instability has made production of IPMS polymers having a higher PMS content very difficult in the past and resulted in unacceptably high amounts of product having properties outside the desired specifications.

Without limiting the scope of the invention, it is believed that the new catalyst system has greatly simplified and accelerated the initiation process by eliminating the sequence of chemical reactions required prior to the formation of a propagating ion pair with previous catalyst systems. Reactor operations are more controllable when initiation is fast and simple as it is with a catalyst system according to this invention. With a TMPCl/Lewis acid catalyst system, reactors respond rapidly to changes in catalyst rate so that standard reactor computer control systems are able to rapidly correct any drifts in flash gas and maintain stable reactor control.

Furthermore, with the previous complicated sequence of initiation steps, all of the complexes and ion-pair equilibria involved were sensitive to temperature and to changing ratios of monomers (i.e., especially ratios of PMS and its inherent impurity, meta-methylstyrene (MMS)) so any perturbation in reactor temperature or flash gas affected all these equilibria to amplify the change. Thus, the reactor response to catalyst rate changes was typically slow and inconsistent depending upon temperature and how the various intermediate equilibria in the multiple initiation steps were being affected, resulting in a failure to achieve an acceptable level of computer control (i.e., reactor response to catalyst rate changes was different at different times as a result of process variables that can neither be detected or controlled).

In addition, because of the rapid reactor mass fouling rate, reactors had to be operated at very low slurry concentrations and heat loads to achieve the run lengths required to allow washing and turnaround to be accomplished in the time available before the fouled reactor had to be put back into production to replace another fouled reactor. Reactor heat loads needed to be so low that reactor polymerization temperature was the frozen film temperature which is dependent upon reactor hydrocarbon level. The fact that reactor polymerization temperature is governed by the frozen film temperature at low heat loads coupled with the fact that the previous catalyst systems were strongly activated by rising temperature typically caused uncontrollable cycles in reactor flash gas and temperature. These cycles usually caused IPM reactors to operate in an unstable, oscillating manner with computer control unsatisfactory, if not impossible, resulting in production of product failing to meet desired specifications.

The catalyst system of this invention has greatly ameliorated or entirely eliminated this reactor control instability. The reactor responds rapidly to catalyst rate changes with the new catalyst systems so small perturbations are easily corrected. Additionally, reactor heat loads can be increased due to a reduced fouling rate. This results in the reactor temperature being controlled by the heat load and heat transfer coefficient (i.e. required differential temperature between reactor heat removal systems and reactor polymerization temperature) instead of being controlled by the frozen film temperature, which continuously changes as a function of reactor hydrocarbon level. Thus, stable reactor flash gas and temperature, as well as uniform, IPMS copolymer having properties within the desired specifications can be produced with the TMPCl/EASC catalyst system, even at 10–20 weight percent PMS content.

Another benefit of the catalyst system of this invention relative to conventional catalyst systems is a significant increase in conversion. The catalyst system of this invention permits production of IPMS copolymers of the desired molecular weight at lower steady state hydrocarbon levels in the reactor than was previously possible, therefore mitigating the problems associated with the unconverted PMS monomer left in the polymer.

The reasons for the improved conversion afforded by the catalyst system according to the invention are not clear, but can speculated upon. It is known that one of the most important termination reactions in IPMS polymerization is the propensity to "back bite" on the enchained aromatic ring when a new monomer unit adds to a propagating styrenyl carbenium ion chain end (p-methyl styrenyl or especially m-methyl styrenyl carbenium ion) with ring closure to form a non-propagating indanyl carbenium ion. This indanyl ring formation termination reaction becomes less favored as Lewis acidity of the catalyst is reduced. Therefore, copolymer molecular weight under a given set of conditions tends to rise as acidity, or effectiveness to act as an alkylation catalyst, goes down. Hence, reduced acidity allows operation at higher conversion to produce the desired molecular weight. The HCl/Lewis acid catalyst systems used previously are more acidic than the TMPCl/EASC catalyst system. Therefore, the catalyst system according to this invention allows operation at higher conversion to ameliorate the problems associated with unreacted PMS.

Another reason for the improved conversion using a catalyst according to this invention is that the stabilizing initiator promotes less chain transfer activity than conventional catalyst systems used in IPMS polymerization. All initiators have some propensity to also act as chain transfer agents, thus reducing polymer molecular weight. Those initiators which are powerful (i.e. fast) initiators and poor chain transfer agents yield higher molecular weight product. The step-wise initiation sequence required with previous catalyst systems resulted in many transfer agents being present in the reactor simultaneously (i.e. HCl, tBuCl, TMPCl). Consequently, conventional processes typically yield lower molecular weight product than the process of this invention. The TMPCl/Lewis acid catalyst system eliminates the intermediate transfer agents; since the propagating ion pair is formed directly, it produces higher molecular weight under any set of conditions, thus permitting desirable operation of the copolymerization process at higher conversion of monomer to product and with higher molecular weight products.

The slurry catalyst system of this invention by its very nature includes a measurable amount of chain terminators. That is to say, the catalyst system of the invention is a non-living system. It is preferable, however, that the process and catalyst system contain a minimum amount or be substantially free of impurities which can complex with the catalyst being used or which can copolymerize with the monomers themselves. There are thus a great number of species which, if present in even trace amounts, will adversely affect cationic polymerization by reducing the polymer molecular weight thereof, broadening the molecular weight distribution, or in extreme cases even preventing polymerization entirely. These chain terminators are well known to those skilled in this art, and they function by reacting or complexing with the Lewis Acid polymerization catalyst or the propagating carbenium ion chain carriers. They are thus loosely referred to as "poisons," and they include a large number of Lewis bases such as water, alcohols, ethers, compounds containing carbonyl groups, nitrogen-containing compounds, such as amines, amides, nitrites, etc., and sulfur-containing compounds, such as mercaptans, thioethers, etc. These impurities or poisons also include many olefinic compounds which act as terminators or transfer agents in cationic polymerizations, such as butenes, cyclopentadiene, alpha-diisobutylene, m-methylstyrene, etc., as well as species containing cationically active halogens, such as allylic, tertiary, or benzylic halogens, and basic oxides.

Since this list of impurities or "poisons" is rather extensive, it is generally necessary to carry out careful and elaborate purification processes in order to achieve pure enough materials so as to enable production of high molecular weight polymers by cationic polymerization processes. Therefore, in producing the uniform, narrow molecular weight distribution copolymers and high molecular weight copolymers of the present invention, it is preferred that the para-alkylstyrene be at least 95.0 wt. % pure, and preferably 97.5 wt. % pure, most preferably 99.5 wt. % pure, that the isoolefin be at least 99.5 wt. % pure, and preferably at least 99.8 wt. % pure, and that the diluents employed be at least 99 wt. % pure, and preferably at least 99.8 wt % pure. Again, however, the "purity" referred to in these preferred figures is understood to be the absence of the impurities or poisons discussed above, and therefore far larger quantities of inert materials are permissible therein. Thus, the isobutylene must not contain more than about 0.5% of such impurities or poisons, but may contain larger quantities of an inert material like butane, or methyl chloride.

It is also preferred to minimize or eliminate the presence of any proton scavenger in the process such that the catalyst system of this invention is substantially free of any proton scavenger. The nature of proton scavengers are well known and described in the Journal of Macromolecular Science Chemistry, vol. A 18, No. 1, 1982, pgs. 1–152 or Carbocationic Polymerization by Joseph P. Kennedy and Ernest Marechal at pgs. 32, 199, 449, 452 460 and 461 and incorporated by references herein.

EXAMPLES

The following examples relate to the use of the invention in the production of IPMS copolymers. They are illustrative of a preferred embodiment and should not be interpreted as limiting the invention. Those skilled in the art will develop many other ways of practicing these teachings disclosed herein of our improved process for a continuous slurry polymerization of isomonoolefin-para-alkylstyrene copolymers. Data from Examples 1–9 are summarized in Table 1. Data from Examples 10–17 are summarized in Table 2.

Examples 1–9

A series of batch polymerizations was carried out in a laboratory dry box equipped with a low temperature bath set at −98° C. The feed used in the polymerizations was 90% methyl chloride diluent and 10% monomers. The monomer blend contained isobutylene and 6 mole % p-methylstyrene. Polymerization temperature was in the range of −90 to −95° C. Many of the advantages of the improved catalyst system of this invention using the stabilizing initiators in combination with Lewis Acids are not observed and quantified in batch runs. These advantages include the reduction of "mass fouling" rates and improvement in reactor "stability" and control, which are more relevant in a continuous process. However, many of these advantages in a continuous process, however, result from improved molecular weight and the rapidity and effectiveness of initiation which can be readily isolated and studied in the batch runs. Therefore, Examples 1–9 provide a good indication of improvements that would be expected in a continuous process.

TABLE 1

Stabilizing Initiators vs. Conventional Initiators, Effect on Molecular Weight

| Example | Type | Lewis Acid (LA) | Initiator (I) | LA/I (mole ratio) | Solvent | $M_p *10^{-3}$ g/cc | $M_w *10^{-3}$ g/cc | $M_w/M_n$ | PMS wt % |
|---|---|---|---|---|---|---|---|---|---|
| 1 | Inv. | EASC | TMPCl | 2.5/1 | MeCl | 642 | 803 | 3.7 | 13.8 |
| 2 | Inv. | EASC | TMPCl | 5/1 | MeCl | 851 | 911 | 4.9 | 13.8 |
| 3 | Inv. | EASC | TMPCl | 10/1 | MeCl | 941 | 1025 | 6.7 | 13 |
| 4 | Inv. | EASC | TMPCl | 20/1 | MeCl | 941 | 1102 | 3.0 | 13.6 |
| 5 | Comp. | EASC | HCl | 5/1 | MeCl | 262 | 331 | 5.8 | 14 |
| 6 | Comp. | EASC | HCl | 10/1 | MeCl | 468 | 521 | 7.2 | 12.6 |
| 7 | Comp. | EASC | HCl | 20/1 | MeCl | 496 | 491 | 7.0 | 13.2 |
| 8 | Inv. | EADC | TMPCl | 2.5/1 | MeCl | 242 | 344 | 4.2 | 14.8 |
| 9 | Comp. | EADC | HCl | 5/1 | MeCl | 176 | 243 | 5.7 | 11.4 |

Examples 1–4 show and Comparative Examples 5–7 show that molecular weight of the copolymer increases as the mole ratio of Lewis acid to initiator increases. Examples 2–4 show that the equivalent catalyst systems using TMPCl produce polymers having a much higher weight average molecular weights ($M_w$) than those using HCl as the initiator. Example 2 shows a 175% increase in $M_w$ over that of Comparative Example 5. Example 3 shows a 97% increase in $M_w$ over that of Comparative Example 6. Example 4 shows a 124% increase in $M_w$ over that of Comparative Example 7.

Examples 8 and 9 show a comparison of TMPCl and HCl as initiators with a different Lewis acid than that of Examples 1–7. Comparative Example 9 has a mole ratio of Lewis acid to initiator twice that of Example 8. Normally an increase in this ratio is expected to lead to an increase in molecular weight as shown previously by Examples 1–7. However, even with a lower ratio of Lewis acid to initiator, Example 8 shows an increase in $M_w$ of 42% for the system using TMPCl.

In these experiments the molecular weight distribution is measured by a Waters Gel Permeation Chromatograph operating at ambient temperature and calibrated by polyisobutylene standards. $M_w$ is the weight average molecular weight, $M_p$ is the peak molecular weight and MWD is the ratio of $M_w$ to $M_n$, the number average molecular weight. As can be seen from Table 1, the EASC/TMPCl catalyst system produces polymers with a higher molecular weight ($M_w$ and $M_p$) than those made with EASC/HCl catalysts. Also, the results show that catalyst systems that use EASC produce higher molecular weight than those using EADC. These results indicate that EASC/TMPCl catalyst systems would tend to make higher molecular weight polymers in continuous plants. Since control of continuous plants is typically based on the molecular weight, or Mooney viscosity, of the polymer being made in the reactors, the net effect of using this stabilizing initiator is expected to be an increase in monomer conversion. This is because a lower steady state monomer concentration would be required in the reactors to generate the desired molecular weight.

Examples 10–17

A series of continuous polymerizations was carried out in a commercial scale plant. Comparative Examples 10–13 show attempts and continuous operation with conventional catalyst systems while Examples 14–17 show the improvements derived from the catalyst systems of this invention. Examples 10–17 were all run on the same equipment.

TABLE 2

Stabilizing Initiators vs. Conventional Initiators, Effect on Process Stability and Efficiency

| Ex. | Type | Process | Wt % PMS | Lewis Acid | Initiator | Solvent | Ave. Feed Rate, lb/hr (kg/hr) | Ave. iC$_4$ in Feed, wt % (3) | Ave. Temp., °F. (°C.) | Std. Dev. Temp., °F. (°C.) | Warm Up, °F./hr (°C./hr) |
|---|---|---|---|---|---|---|---|---|---|---|---|
| 10 | Comp. | Butyl Rubber (1) | NA | EADC | HCl | MeCl | 22,982 (10,424) | 29.86 | −139.30 (−95.12) | — | — |
| 11 | Comp. | IPMS (2) | 7.5% | EADC | HCl | MeCl | 20,000 (9,071) | 18.00 | −142.26 (−96.81) | — | — |
| 12 | Comp. | IPMS | 12% | EADC | HCl | MeCl | 25,698 (11,656) | 12.40 | −143.46 (−97.48) | — | — |
| 13 | Comp. | IPMS | 12% | EASC | HCl | MeCl | 26,034 (11,808) | 13.22 | −143.18 (−97.32) | 0.52 (0.29) | 0.26 (0.14) |
| 14 | Inv. | IPMS | 12% | EASC | TMPCl | MeCl | 22,989 (10,427) | 13.18 | −142.90 (−97.17) | 0.16 (0.09) | 0.09 (0.05) |
| 15 | Inv. | IPMS | 12% | EASC | TMPCl | MeCl | 24,002 (10,887) | 13.24 | −142.73 (−97.07) | — | — |
| 16 | Inv. | IPMS | 12% | EASC | TMPCl | MeCl | 23,999 (10,885) | 14.52 | −142.52 (−96.96) | — | — |
| 17 | Inv. | IPMS | 12% | EASC | TMPCl | MeCl | 23,996 (10,798) | 14.51 | −142.10 (−96.72) | — | 0.00 |

| Ex. | Ave. Cat Ratio, Mole LA/mole initiator | Ave. Flash Gas, Wt % (3) | Std. Dev. Flash Gas, Wt % (3) | Ave. Mooney Vis. (4) | Ave. Conv., % (5) | Std. Dev. Conv. % | Ave. Cat Eff., lb polymer/ lb LA | EST. RUN LENGTH Hrs. |
|---|---|---|---|---|---|---|---|---|
| 10 | 3.33 | 5.74 | 0.18 | 51.52 | 83.62 | 0.56 | 2255.07 | 46 |
| 11 | 7.60 | 0.96 | 0.05 | 47.40 | 95.16 | 3.56 | 3067.09 | 27 |
| 12 | 6.00 | 1.53 | 0.44 | 51.50 | 88.59 | 3.32 | 2080.46 | 12 |
| 13 | 7.79 | 1.53 | 0.27 | 44.91 | 87.73 | 2.56 | 1531.90 | 6 |
| 14 | 7.27 | 1.13 | 0.06 | 49.32 | 91.43 | 0.74 | 264.79 | 25+ |
| 15 | 4.02 | 1.11 | 0.06 | 47.56 | 91.40 | 0.35 | 1243.59 | 16+ |
| 16 | 6.00 | 0.93 | 0.06 | 50.48 | 92.74 | 0.43 | 1510.04 | 14+ |
| 17 | 5.07 | 0.86 | 0.08 | 48.99 | 93.93 | 0.54 | 2398.58 | 28 |

(1) EXXON ™ Butyl 268 available from Exxon Chemical Co.
(2) EXXPRO ™ 96-4 elastomer
(3) Weight percent isobutylene by gas Chromotography (GC)
(4) ASTM D-1646 except for a modified sample preparation procedure in which the sample is hot milled to ensure the sample is dry and homogeneous.
(5) Calculated from GC analyses--(iC$_4$ feed weight-weight of iC$_4$ in flash gas)/(iC$_4$ feed weight)

Comparative Example 10 is a conventional commercial scale continuous butyl rubber process. In this process a blended feed of methyl chloride, isobutylene, and isoprene is first chilled to the reactor operating temperature. The feed is then injected into a standard commercial butyl reactor. The catalyst system used is well mixed, diluted with methyl chloride and injected into the reactor through a separate nozzle In the reactor the feed blend and catalyst are mixed and circulated through a chiller that maintains the temperature between −135 and −145° F. This process is similar to that described in Kresge and Wang, "Elastomers, Synthetic (Butyl Rubber)," *Kirk Othmer Encyclopedia of Chemical Technology*, vol. 8, 4th ed., pp. 934–955 (1993).

Comparative Example 11 shows a conventional commercial scale continuous slurry process producing IPMS. The process used for the IPMS polymer is similar to that described for Example 10 except that the comonomer used is PMS in place of isoprene.

Comparative Examples 12 and 13 show the impracticality of producing IPMS copolymers having even moderately higher PMS grades, which are desired in many applications including tire sidewalls, with the older conventional catalyst systems. An economically unacceptable amount of off-spec product is produced due to the inability to maintain reactor stability even with computer control. This is shown by the much higher standard deviations as compared to the example of the invention using TMPCl as an initiator. These standard deviations were derived from one-minute averages of operating data collected at 6 second intervals. Run lengths, even at less than 12% slurry concentrations and very low heat loads, both of which are impractical and/or uneconomic, are far too short to permit normal continuous plant operation. This is shown by run lengths of much less than 24 hours.

Examples 14–17 demonstrate the significant improvement in reactor operability, stability, and production rates produced using TMPCl as a stabilizing initiator. This is demonstrated by the higher conversion, lower flash gas standard deviation, and reduced warm up rate. This shows that production of IPMS copolymers having a higher PMS content is now practical. It naturally follows that production rates of IPMS polymers having lower PMS content can be produced at higher rates because of the higher monomer conversion, while still achieving acceptable reactor run lengths. Examples 14–17 were terminated due to operational requirements unassociated with heat transfer or any need to take the unit out of service for cleaning. In contrast, comparative Examples 11–13 were terminated due to end-of-run conditions requiring shut-down and cleaning of the unit.

Additional data is provided for Examples 13 and 14 in the columns entitled "Std. Dev. Temp. (°C.)" and "Warm Up." The lower value for the standard deviation shows that the use of the new catalyst system produces a steadier temperature profile in the reactor. The lower value for warm up shows that the new catalyst system reduces the rate of fouling in the reactor.

Having shown examples of the specific embodiments of the invention, it would be obvious to those skilled in the art to use other members of the special class of stabilizing initiators described in conjunction with the other Lewis acids under a wide range of operating conditions to both economically produce isoolefin-para-alkylstyrene copolymers having higher pas content and to produce such polymers having lower pas content at higher production rates than is currently possible.

We claim:

1. A continuous slurry catalyst system comprising:
    (a) a metal halide based on a metal selected from the metals tin, titanium, aluminum, and boron;
    (b) an initiator having the formula:

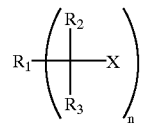

wherein:
        $R_1$ is an alkyl, alkenyl, aryl, arylalkyl, or arylalkenyl group containing up to 30 carbon atoms but not less than 3 carbon atoms unless $R_1$ contains at least one olefinic unsaturation,
        $R_2$ and $R_3$ are alkyl, aryl, or arylalkyl groups containing up to 30 carbon atoms and can be the same or different,
        x is a halogen or carboxy, hydroxyl, or alkoxyl group, and
        n is a positive whole number; wherein the metal halide and initiator are present in a continuous slurry polymerization system.

2. The catalyst system of claim 1 wherein said metal halide of component (a) is a halide of chlorine.

3. The catalyst system of claim 1, wherein the metal halide is selected from dialkyl aluminum halide, monoalkyl aluminum dihalide, aluminum tri-halide, ethylaluminum sesquichloride, or a mixture thereof.

4. The catalyst system of claim 1 wherein the metal halide is represented by the formula:

$$R_nAlX_{(3-n)}$$

wherein:
    n is equal to 1 or 2, R is either the same or different $C_1$ to $C_{15}$ linear, cyclic or branched chain alkyl, aryl or aralkyl or aliphatic cyclic group, and X is the same or different halogen.

5. The catalyst system of claim 4 wherein n is 2, and R is the same $C_1$ to $C_{15}$ linear, cyclic or branched chain alkyl, aryl, aralkyl or aliphatic cyclic group.

6. The catalyst system of claim 5 wherein X is chlorine.

7. The catalyst system of claim 1 wherein the metal halide is diethylaluminum chloride, ethyl aluminum dichloride, or a combination thereof.

8. The catalyst system of claim 1 further comprising one or more solvents wherein the composition of said one or more solvents comprises at least 70% polar solvent on a volume basis.

9. The catalyst system of claim 1 wherein said system is substantially free of proton scavengers.

10. A continuous slurry polymerization process for preparing random copolymers of one or more iso-olefin monomers and one or more para-alkylstyrene monomers comprising reacting in an anhydrous polymerization system of said monomers, a polar solvent, a Lewis acid, and an initiator, said initiator having the formula:

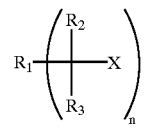

wherein:
    $R_1$ is an alkyl, alkenyl, aryl, arylalkyl, or arylalkenyl group containing up to 30 carbon atoms but not less than 3 carbon atoms unless $R_1$ contains at least one olefinic unsaturation,
    $R_2$ and $R_3$ are alkyl, aryl, or arylalkyl groups containing up to 30 carbon atoms and can be the same or different,
    x is a halogen or a carboxy, hydroxyl, or alkoxyl group, and
    n is a positive whole number.

11. The process according to claim 10 wherein said Lewis acid is a metal halide based on a metal selected from tin, titanium, aluminum, and boron.

12. The process according to claim 11 wherein said metal halide is selected from aryl aluminum halides, aralkyl aluminum halides, and alkyl aluminum halides.

13. The process according of claim 10, wherein said Lewis acid is selected from dialkyl aluminum halide, monoalkyl aluminum dihalide, aluminum tri-halide, ethylaluminum sesquichloride, or a mixture thereof.

14. The process according to claim 10, wherein said Lewis acid is selected from $AlC_3$, $EtAlCl_2$, $Et_{1.5}AlCl_{1.5}$, and $Et_2AlCl$.

15. The process according to claim 10 wherein said polymerization is performed at a temperature in the range of from −10° C. to the freezing point of said polymerization system.

16. The process according to claim 10 wherein said initiator is selected from:

2-chloro-2-phenylpropane;

1,4-di(2-chloro-2-propyl)benzene;

1,3,5-tri(2-chloro-2-propyl)benzene;

3-tert-butyl-1,5-di(2-chloro-2-propyl)benzene;

2-chloro-2,4,4-trimethylpentane; and 2,6-dichloro-2,4,4,6-tetramethylheptane.

17. The process according to claim 10 wherein the ratio of said Lewis acid to said initiator on a molar basis, is from about 1 to 1 to about 20 to 1.

18. The process according to claim 10 wherein said polar solvent is selected from $CH_3Cl$, $EtCl_2$, $CH_2Cl_2$, $CHCl_3$, and $CCl_4$.

19. The polymerization process according to claim 10 said para-alkylstyrene monomer is para-methylstyrene.

20. The polymerization process according to claim 10 said iso-olefin monomer is isobutylene.

* * * * *